J. A. & M. H. McBRYDE.
HAY AND COTTON-PRESS.

No. 182,210.

2 Sheets—Sheet 1.

Patented Sept. 12, 1876.

WITNESSES
Ed. I. Nottingham
Albert W. Bright

INVENTOR
John A. McBryde
Malcolm H. McBryde
By Leggett and Leggett
Attorneys.

2 Sheets—Sheet 2.
J. A. & M. H. McBRYDE.
HAY AND COTTON-PRESS.
No. 182,210. Patented Sept. 12, 1876.
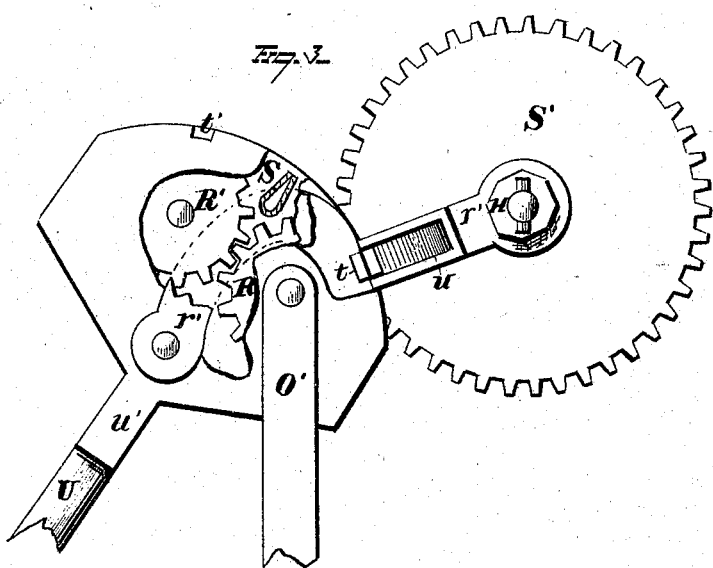
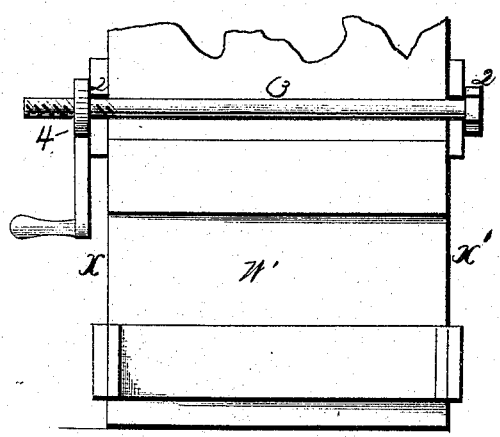

UNITED STATES PATENT OFFICE.

JOHN A. McBRYDE AND MALCOM H. McBRYDE, OF LAURINBURG, N. C.

IMPROVEMENT IN HAY AND COTTON PRESSES.

Specification forming part of Letters Patent No. 182,210, dated September 12, 1876; application filed June 26, 1876.

*To all whom it may concern:*

Be it known that we, JOHN A. McBRYDE and MALCOM H. McBRYDE, of Laurinburg, in the county of Richmond and State of North Carolina, have invented certain new and useful Improvements in Hay and Cotton Presses; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to certain improvements on the hay and cotton press patented to J. A. McBryde, No. 148,730, dated March 17, 1874.

Figure 1:
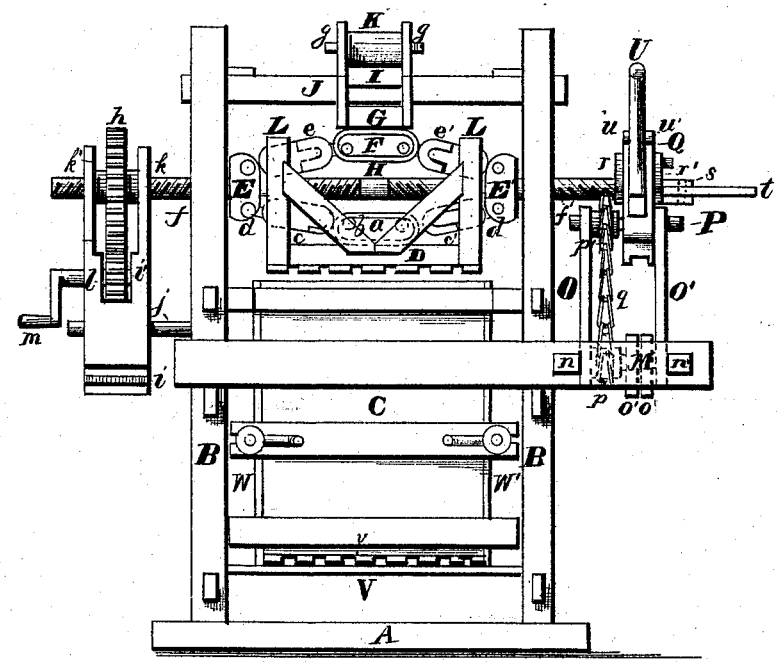
Figure 2:
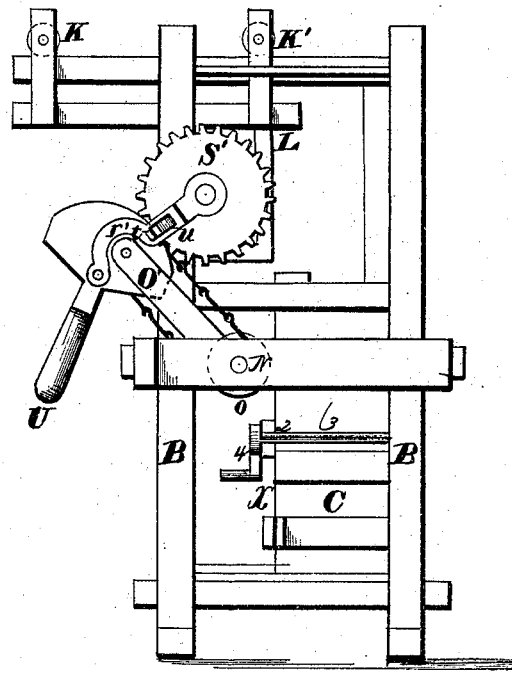

Figure 1 is a front elevation of our improved hay and cotton press, showing the follower in its raised position. Fig. 2 is a side elevation of the same, with the follower moved away from the press-box. Fig. 3 is a detached view of the power-gearing. Fig. 4 represents the press-box and means for securing the door thereto.

Our invention consists, first, in the combination, with the follower of a hay and cotton press, the follower constructed to be moved away from the top of the press-box, of hand-gearing, constructed to be moved in unison with the follower, whereby the gearing is at all times in position to actuate the follower; second, in the combination, with the follower, constructed to be moved laterally from the top of the press-box, of reversible power-gearing, constructed to raise and lower the follower; third, the combination, with laterally-movable follower, of reversible power-gearing, constructed to lock the follower at any desired height; fourth, in the combination, with the follower, of a cross-bar, supported by rollers on a beam or track secured to the main frame of the press; fifth, in certain details of construction, as hereinafter described and claimed.

In the accompanying drawings, wherein like letters designate like parts, A represents the sills of the press-frame, and B the uprights, four or more, which serve to support the press-box C. To the upper side of follower D the double hinge plate $a$ is secured in any desired manner, and within this plate are journaled the pintles $b$ of the toggle-arms $c\ c'$. The pintles $d\ d'$ attached to the opposite ends of toggle-arms $c\ c'$ have their bearings in the nuts $E\ E'$. The upper double hinge plate or bearing F is secured to the sliding bar G, and said plate F is connected with the nuts $E\ E'$ by means of the toggle-arms $e\ e'$. Through nuts $E\ E'$ is inserted a rod, H, having right and left hand screw-threads $f\ f'$.

When rod H is turned in one direction the nuts are drawn toward each other, and the toggles serve to force the follower downwardly into the press-box. A reverse movement of the rod H raises the follower.

Hay and cotton presses as ordinarily constructed are provided with toggles of sufficient length to raise the follower at a sufficient height above the press-box to allow of the insertion of the cotton into the press-box.

It is well known that toggles with short arms are by far more durable, occupy much less space, and apply the power more directly than toggles with long arms; and, hence in the present case the toggles are constructed of such dimensions that they will raise the follower clear of the press when the follower is moved in a lateral direction, in order to allow of the packing of the press-box. This result is accomplished by the following means: A track or beam, I, is firmly secured to the upper sides of the cross-braces $J\ J'$, and upon said track the rollers $K\ K'$, two or more, have their bearing. These rollers are journaled in uprights $g$, secured to the movable bar G. When the follower has been raised clear of the press-box it may be easily pushed from over the same, as shown in Fig. 2, to allow of the insertion of cotton into the press-box, and, when the latter is filled, the follower is returned to its former position over the press-box, and forced into the same until the cotton therein contained has been reduced to the desired density.

The follower D is provided with a guide-frame, L, which fits snugly within the press-box, affording an increased bearing for the follower, and thereby prevents the same from wedging within the box when the cotton is of unequal density over the surface of the same. The guide-frame also serves to retain the follower in position, when the doors of the press-box are removed. The follower may be actuated by the hand-gearing as follows: The large cog-wheel $h$ is rigidly secured to one end of the screw-rod H. A brace, $i$, slotted at $i'$, rests on a rod, $j$, secured to one of the uprights of the press-frame. The outer end of brace $i$ is cut away to form arms $k$ $k'$, which are journaled to rod H, on either side of the cog-wheel $h$.

A smaller cog-wheel, $l$, constructed to mesh with cog-wheel $h$, is secured to a crank-shaft, $m$. The smaller wheel being turned it imparts motion to the larger wheel and rod H, thereby raising or lowering the follower. When the follower is moved away from the top of the press the brace $i$ turns on its bearing $j$, and freely moves with the screw-rod H.

When it is desired to operate the press by steam or other motive power, the following attachment is combined with the screw-rod H of the press. Between the cross-braces $n$ $n'$ of the frame M, the shaft N carries the loose and tight band-pulleys $o$ $o'$, the tight pulley having a chain-wheel, $p$, secured thereto. Upon the outer ends of the shaft N are supported the links O O', the upper ends of which serve as bearings for the shaft P, which in turn supports the housing Q. Between the housing Q and link O the chain-wheel $p'$ is secured to shaft P, and by means of chain $q$ the shaft P is rotated when the driving-belt is shifted onto the tight pulley $o'$. Cog-wheels R R' are journaled to mesh with each other within the housing Q, and midway between the wheels R R', a tooth, S, is formed in the outer face of the housing. Upon the outer end of the screw-rod H is secured a large cog-wheel, S', and said cog-wheel is kept in engagement with either the upper or lower cog-wheel R R' by means of the links $r$ $r'$, the outer ends of which are pivoted to the housing, while their inner ends are secured to the screw-rod H on either side of the cog-wheel S'. The link $r'$ has a bearing, $s$, for a detent, $t$, the inner end of which is forced into one of the notches $t'$ of housing Q, by means of a spring, $u$. A handle, U, is secured within the arms $u^1$ $u^2$ of housing Q.

The operation of this gearing attachment is as follows: Power being applied to the tight pulley $o'$ it is communicated to the cog-wheels R R' by means of the chain and chain-wheels, thus driving the pulleys R R' in opposite directions. When it is desired to force the follower into the press-box, the handle U is depressed, thereby turning the housing on the shaft P until the lower cog-wheel R meshes with the large cog-wheel S', when the screw-shaft H will be revolved from left to right, and operate to force down the follower.

When the cotton has been reduced to the desired density, the handle U is raised on a plane with the screw-rod H, and in this position the follower is locked from any movement in either direction, and thus allows of the baling of the cotton within the press-box. When this latter operation has been accomplished, the handle U is raised still farther to throw the upper cog-wheel R' into engagement with the wheel S', when the screw-rod H will be turned from right to left, and the follower will be then raised from the press-box. The platform V is provided with the usual slats $v$, secured at a sufficient distance apart to form spaces for the bands.

The lower portion of the press-box is made up of the removable end pieces W W' and sides X X'.

The sides have cleats 1 formed at their ends with open slots 2. When the sides are placed in position, the tie-rods 3 are inserted in the slots 2, and, by turning down the hand-nuts 4, the sides are held securely against the end pieces W W'.

Having fully described our invention, what we claim as new, and desire to secure by Letters Patent, is—

1. The combination, with the screw-rod of a toggle-press, of a hand-gearing attachment, constructed and arranged substantially as described, whereby the gearing may accommodate itself through a vertical or lateral movement, substantially as and for the purpose set forth.

2. The combination, with the screw-rod of a toggle-press, wherein the follower has a lateral movement, as set forth, of a reversible power-gearing attachment, constructed and arranged to admit of a movement in unison with the screw-rod of the press, substantially as and for the purpose described.

3. In a hay and cotton press, the combination, with the screw-rod of a vertically and laterally moving follower, of a reversible power gearing, constructed to lock the follower at any desired height, substantially as and for the purpose described.

4. The combination, with the follower and toggles of a hay and cotton press, of an elevated cross-bar, adjustable in a right-angular plane to the vertical travel of the follower, substantially as and for the purpose described.

5. In a hay and cotton press, the combination, with the follower, toggles, and rollers, traveling an elevated track, of an intermediate bearing-bar, supported by standards secured to the axis of said rollers, substantially as and for the purpose described.

6. The combination, with the cog-wheel S', of the housing Q and cog-wheels R R', substantially as and for the purpose specified.

7. The combination, with the cog-wheels S' R R' of the housing Q, constructed with a tooth, S, substantially as and for the purpose specified.

8. The combination, with the cog-wheels S'

R R' and housing Q, of the links $r$ $r'$ and spring-pressed detent $t$, substantially as and for the purpose set forth.

9. The combination, with the housing Q, cog-wheels S' R R', of the chain-wheels $p$ $p'$ and chain $q$, substantially as and for the purpose specified.

In testimony that we claim the foregoing as our own we affix our signatures in the presence of two witnesses.

JOHN A. McBRYDE.
MALCOM H. McBRYDE.

Witnesses:
  W. R. McEACHIN,
  JAS. M. GRAHAM.